MAGNETIC DATA STORAGE DEVICE

Original Filed April 1, 1957

INVENTOR
Hugh M. Taft

May 26, 1964 H. M. TAFT 3,134,969

MAGNETIC DATA STORAGE DEVICE

Original Filed April 1, 1957 4 Sheets-Sheet 2

INVENTOR

Hugh M. Taft

BY

ATTORNEYS

May 26, 1964 H. M. TAFT 3,134,969

MAGNETIC DATA STORAGE DEVICE

Original Filed April 1, 1957 4 Sheets-Sheet 3

INVENTOR

Hugh M. Taft

BY

ATTORNEYS

May 26, 1964 H. M. TAFT 3,134,969

MAGNETIC DATA STORAGE DEVICE

Original Filed April 1, 1957 4 Sheets-Sheet 4

INVENTOR

Hugh M. Taft

BY

ATTORNEYS

United States Patent Office 3,134,969

Patented May 26, 1964

3,134,969

MAGNETIC DATA STORAGE DEVICE

Hugh M. Taft, Springfield, Vt., assignor, by mesne assignments, to Ex-Cell-O Corporation, Detroit, Mich., a corporation of Delaware Original application Apr. 1, 1957, Ser. No. 649,984, now Patent No. 3,063,039, dated Nov. 6, 1962. Divided and this application Aug. 17, 1961, Ser. No. 144,277
4 Claims. (Cl. 340—174.1)

This invention relates to improvements in magnetic data storage devices, and more particularly to means for rotatably supporting and driving these devices.

The present application is a division of application Serial No. 649,984, filed April 1, 1957, which has now matured as U.S. Letters Patent No. 3,063,039, issued November 6, 1962.

Electronic computers, recorders, and the like, utilize a magnetizable medium for storage of information that is to be saved for future use, such information being transposed into discrete, magnetized code dots on the medium. The dots, or train of dots, may be recorded by a pulse from a transducing head located close to the surface layer of the medium. The medium is commonly a rigid magnetizable surface layer of a body, such as a drum which is rotated at high speed. The rotational speed of such drums makes possible a high pulse packing density, i.e. a high storage capacity per unit area of the medium, limited only by the diffusion pattern of the magnetic pulse proportional to the power input of the transducing heads. The magnitude of this power input is governed by the comparatively great head-to-drum clearance dictated by present design and manufacturing limits. The principal limitations to close head-to-drum spacing are eccentricity between the drum and rotational axes, in combination with out-of-roundness of the co-acting elements, both of which produce objectionable variation in amplitude of the output signals. With a fixed amount of eccentricity this amplitude variation increases with close head-to-drum spacing thus making it particularly important to reduce or eliminate the eccentricity. This invention eliminates the factor of eccentricity by combining the recording and journal surfaces and supporting the magnetizable member on pressurized gas lubricated bearings.

An object of this invention is to provide a magnetic data storage device having a rotatable magnetizable member with transducing heads mounted to provide a minimum head-to-drum clearance. This is accomplished by journalling means for the drum which eliminate eccentricity, and more particularly by a construction wherein the perimeter of a conical shaped drum provided with such said magnetizable layer forms the journal portion of a pressurized gas lubricated bearing.

An additional object is to provide means to adjust and control the clearance between the surface of the magnetizable member and its bearing.

Another object of this invention is to provide a compact driving arrangement for the magnetizable member.

It is also an object to provide a magnetizable member for a magnetic data storage device which will be simple to machine as the magnetizable surface is also the journal surface.

Further objects and advantages of the invention will be apparent from the following description and accompanying drawings wherein.

Figures 1, 3:
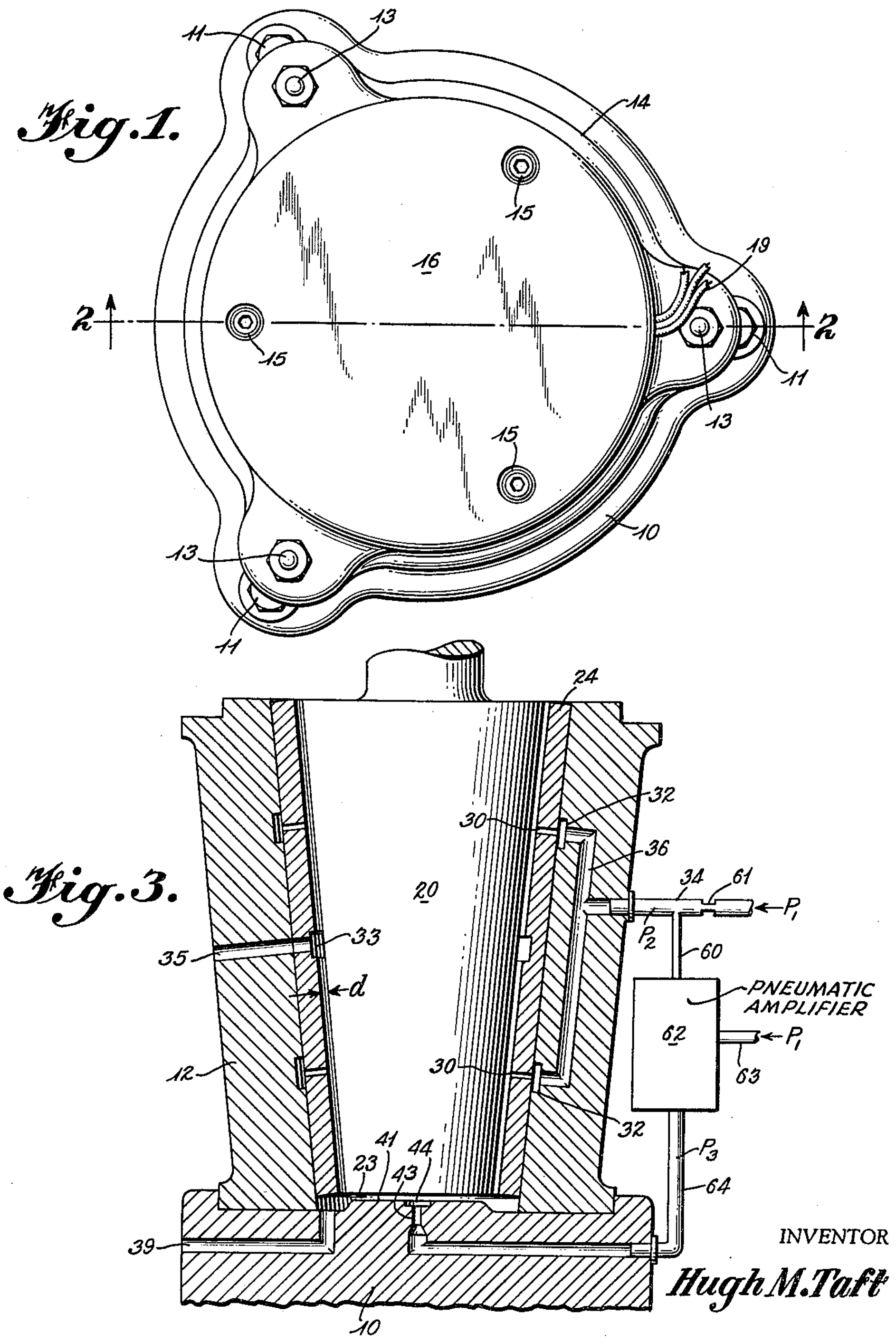
FIGURE 1 is a top plan view.
FIGURE 3 is a partial side elevation section of a magnetic data storage device showing a modification thereof.
Figure 2:
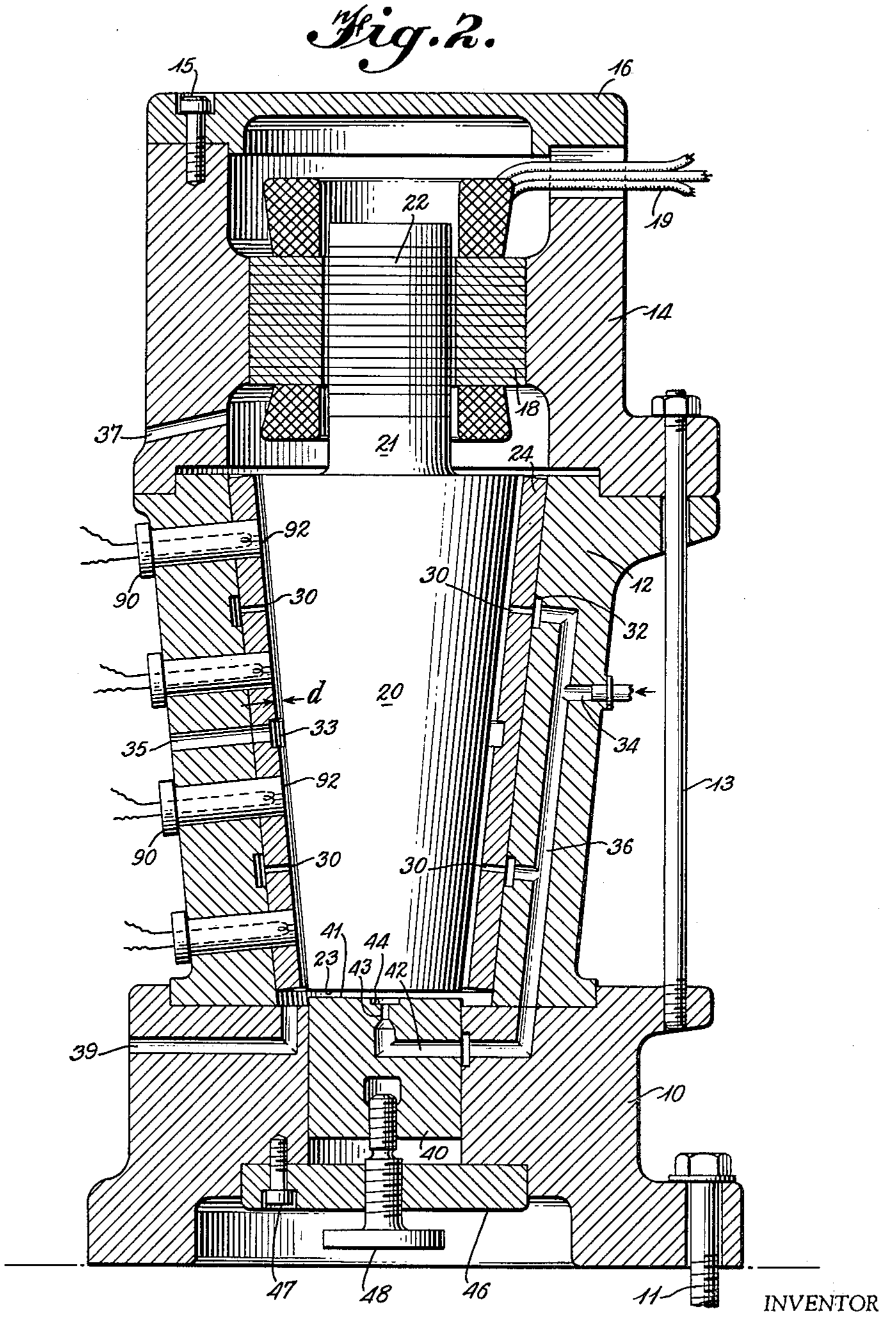
FIGURE 2 is a side elevational view along line 2—2 of FIGURE 1 showing the preferred embodiment of the magnetic data storage device.

Referring to the drawings, FIGURES 1 and 2 show the elements of a magnetic storage device in a preferred embodiment with the drum mounted for rotation about a vertical axis. A bracket 10, fastened to a suitable base by means of screws 11, supports a bearing housing 12, which in its turn supports a housing 14 for an electric motor stator 18. The members 10, 12 and 14 are aligned by suitable co-acting circular pilots and are held together by tie rods 13. Cap 16 closes the upper access opening to housing 14 and is fastened thereto by screws 15. Power supply lines for the motor are indicated at 19.

A magnetizable member 20 has the form of a frustum of a right circular cone. An integral shaft portion 21 carrying a rotor 22 of the motor extends upwardly from the large end of the frusto conical member 20. The lower and small end of the member 20 has a surface 23 perpendicular to the rotative axis of the drum and this surface 23 forms the runner element of a thrust bearing. The bearing housing 12 has a tapered bore, and a bearing liner 24 is pressed inside this bore. The interior of the liner 24 is formed as a complementary bearing surface for the frusto conical member 20. Suitable electromagnetic transducing heads 90 are mounted in housing 12 and extend through bearing liner 24 with their innermost ends 92 flush with the bearing surface.

The member 20 is rotatably supported both radially and axially in pressurized gas lubricated bearings. An annular groove 33 encircles the sleeve 24 at equal distance from the ends. Located half way between groove 33 and the upper and lower ends of the sleeve are two encircling rows of restricted metering holes 30 in communication with annular grooves 32 in housing 12. Passages 34 and 36 in the housing 12 are also in fluid communication with grooves 32. A gas is supplied at a pressure greater than atmospheric through passages 36 and 34, grooves 32 and holes 30. The gas pressure acting through the holes 30 tends to always hold the journal in concentric relationship to the bearing. The flow of gas is allowed to escape to the atmosphere through passages 35, 37 and 39.

The bearing support also includes a thrust bearing having a runner portion, the surface 23, and a stationary bearing portion, a surface 41. In the center of surface 41 there is a shallow recess 44 connected by a restricted metering hole 43 to passage 42 to which pressurized gas is supplied from passage 36. The flow of pressurized gas through the hole 43, will cause a separation between surfaces 23 and 41 to vertically lift and support the member 20 in an axial position commensurate with a predetermined radial clearance "*d*."

One means for adjusting the radial clearance "*d*" is shown in FIGURE 2. The surface 41, and fluid passages 42, 43 and 44 are contained in a cartridge 40 axially slidable in a central bore of bracket 10. This bore is bridged at its lower end by cap 46 rigidly fastened to bracket 10 by screws 47. Caps 46 has a central threaded hole and the bottom end of cartridge 40 also has a threaded hole, and these holes are threaded with different leads to accommodate a differential screw 48, thus providing means for obtaining a desired delicate axial adjustment of the cartridge 40. The proportioning and adjustment of the described elements should preferably be such that when the system is at rest and the member 20 and surface 23 rest on surface 41 there should still be present a residual clearance between the conical sides of the member 20 and the bearing sleeve 24.

In FIGURE 3 there is shown a means to automatically adjust the axial position of member 20 to compensate for factors that may cause variations in the radial clearance "*d*." The taper of the frusto conical member 20 may be in the order of 1:10 on the radius, i.e., a change in axial position will produce one-tenth as much change in radial clearance. The initial fit of the drum in the bearings may be such that approximately .0005" separation between surfaces 23 and 41 of the thrust bearing will give a radial clearance in the order of .0002" to .0003" between the tapered journal surface of member 20 and its bearing sleeve 24. The pressurized gas flow through the clearance spaces provides a restoring force when some external force tends to move the drum to an eccentric position, either during rotation or at rest, thus the bearings have a hydrostatic capacity. When pressurized gas is supplied, the drum and rotor assembly instantly moves to its central, freely suspended position. The motor is then energized and the rotatable assembly accelerates. During this period of acceleration there is a gradual increase in the centrifugal stresses and consequent increase in diameter of the drum. Also during this period, and after reaching rotational speed, heat develops from sundry sources, e.g. from the current flow to the electric motor, and from gas film shear or friction in the bearings. The resultant changes in size of various elements due to thermal expansion, can influence the radial clearance "*d*." Although these dynamic conditions would not be considered serious in rotating assemblies having clearances in the order heretofore used, with the very small clearances needed for close head-to-drum spacing these conditions become important.

Assuming that the sum of all the dynamic changes mentioned above results in a decreased radial clearance at a given moment of time, thus causing a decrease in the air flow through all holes 30, then the pressure $P_2$ in the passages downstream from an external restricted orifice 61 will increase. This increased pressure is transmitted as an input signal to a pneumatic amplifier 62 by means of a sensing line 60. The amplifier acts to produce an output signal in the form of an increased pressure $P_3$ in line 64 supplying the thrust bearing causing the member 20 to lift slightly, thus increasing the radial clearance. At this point a new balance of the system is again reached.

In the same way the sum of the dynamic changes may produce an increased radial clearance at a given moment of time. By the reverse of the steps described above the member 20 will drop slightly until the balance of the system is restored as before.

Figure 4:
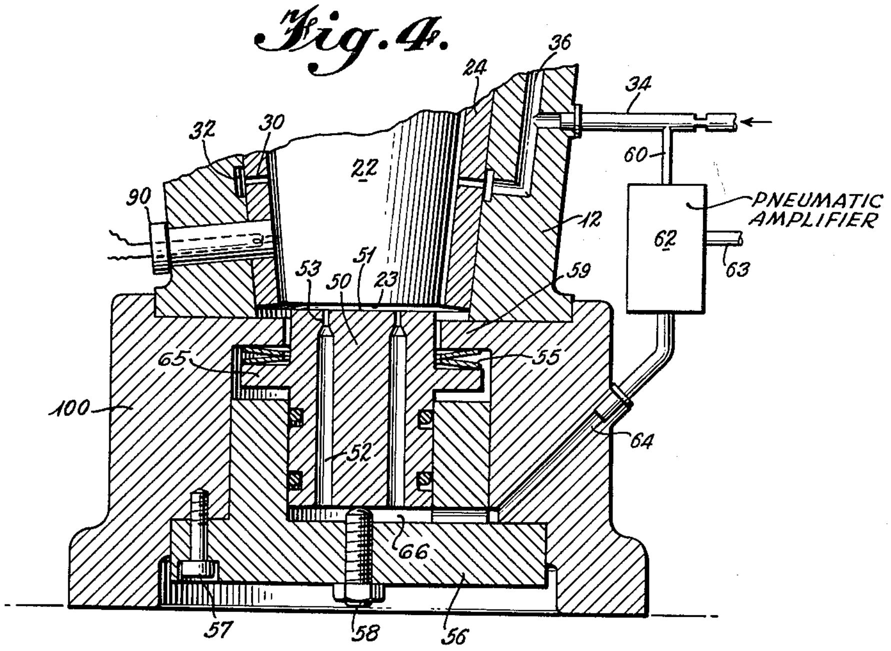
FIGURE 4 is a partial side elevation section of another modification.

Another modification of the thrust bearing is shown in FIGURE 4. The bottom bracket 100 has a central bore containing a flanged cartridge 56 rigidly fastened to the bracket by screws 57. The interior of the cartridge forms a cylinder for a piston 50. A spring 55 is interposed between a flange 59 on bracket 100 and a flange 65 on piston 50 forcing the piston downwards against a stop screw 58. A cavity 66 is supplied with regulated pressurized gas from line 64. The upper face 51 of the piston is the thrust bearing co-acting with surface 23 of the member 20. A series of restricted metering holes 53 are arranged in a circle and are in communication with the pressurized cavity 66 through passages 52. The effect of this arrangement is that the surfaces 51 and 23 are always kept at a predetermined distance, while the piston 50 is physically moved as a result of the function of the system described for FIGURE 3. The stop screw 58 prevents the piston 50 and thereby member 20 from taking a position at rest that would result in physical contact between the perimeter of member 20 and the bearing sleeve 24.

Figure 5:
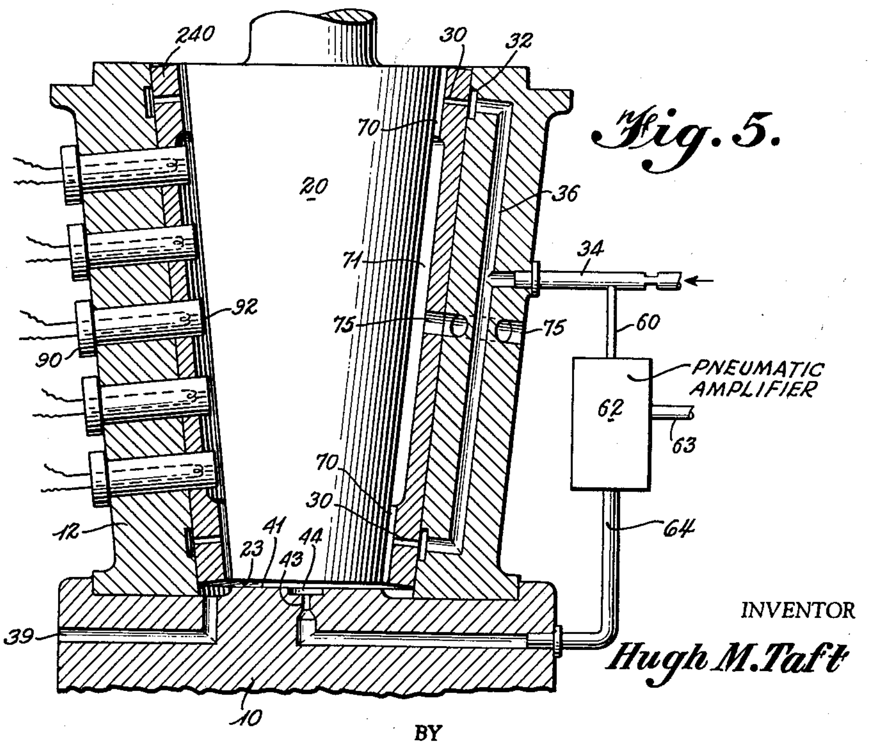
FIGURE 5 is a partial side elevation section of another modification.

A modification in the arrangement of the radial bearings is shown in FIGURE 5. In this modification the bearing zones 70 are limited to the upper and lower ends of a sleeve 240 and are separated by a relieved portion 71 of larger diameter, having a passage 75 to the atmosphere. Otherwise the elements of the bearings are arranged and function as previously described with respect to FIGURE 3. Electromagnetic transducing heads 90 are mounted in the bearing housing 12 with their innermost ends 92 extending into the relieved portion 71 to a position parallel with an imaginary cone established by the bearing portions 70.

Figure 6:
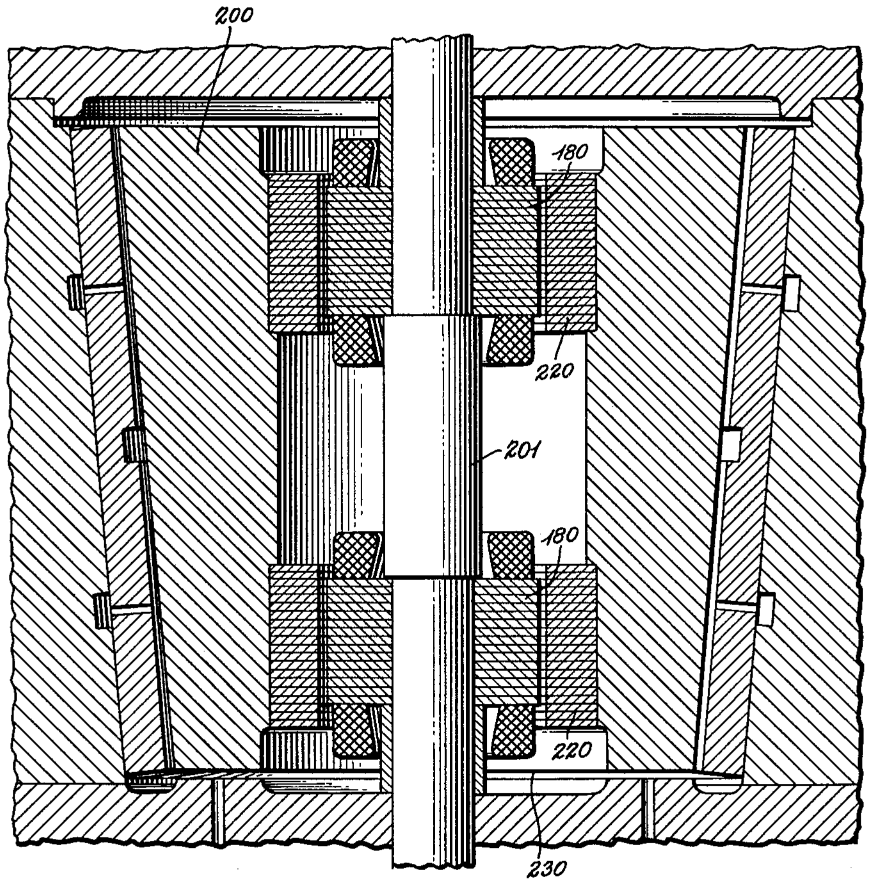
FIGURE 6 is a partial side elevation section illustrating a different arrangement of the driving elements.

FIGURE 6 illustrates another arrangement of the driving elements suitable for drums of large diameter. The member 200 forms a shell having a magnetic layer on its conical outer surface which forms the journal. The interior of the drum is provided with a bore in which is fitted an armature 220 of one or more induction motors. A laminated core 180 with field windings is carried by a fixed shaft 201. One end face of the drum shell forms the journal portion 230 of the thrust bearing.

A novel magnetic storage device has been disclosed by the applicant. The journalling and driving arrangements disclosed provide for faster and more accurate transposing of intelligence data to a magnetic storage device and consequent quick access to such recorded data. The applicant has shown and described several embodiments, however, the described embodiments are for illustration only and are not limiting. Other arrangements will be apparent to those skilled in the art, therefore applicant claims full range of equivalents within the scope of the appended claims.

What is claimed is:

1. A magnetic data storage apparatus comprising: a tapered drum-like rotatable member having two ends and a perimeter side surface therebetween, said member being vertically disposed with its larger diameter end on top; an unbroken magnetizable surface layer on said side surface; a supporting structure having a tapered bore whose inner surface is adjacent to but not touching said side surface; electromagnetic transducer heads embedded in said supporting structure and adapted to record, read and erase magnetic bits of data information on said surface layer; means rotating said rotatable member; supporting means maintaining said rotatable member freely suspended within said supporting structure comprising means for introducing a pressurized fluid within the space between said side surface and said inner surface for radial support, and further comprising means to introduce a pressurized fluid within a thrust bearing means supporting the smaller diameter end of said rotatable member; sensing means adapted to sense variations of clearance within the space between said side surface and said inner surface as a function of variations of pressure in a conduit supplying pressurized fluid into said space; and means controlled by said sensing means for causing a variation of flow of pressurized fluid into said thrust bearing to maintain said clearance substantially constant.

2. The apparatus of claim 1 wherein the thrust bearing means comprises a portion dependent from the supporting structure, said portion being adapted to be axially movable, and manual adjusting means for axially moving said portion for initial adjustment of a predetermined clearance between said side surface and said inner surface.

3. An apparatus for magnetic data storage comprising: a truncated conical rotatable member having a vertical axis and being disposed with its larger diameter on top; a magnetizable surface on said conical member; a housing for said conical member, said housing having a cavity therein complementary of said member; at least one electromagnetic transducer head supported by said housing and adapted to record, read and erase magnetic bits of information on said magnetizable surface without physical contact therewith; means rotating said conical member; pressurized fluid bearing means for rotatably supporting said conical member, said bearing means comprising a combination of radial bearing means, defined by the space between the outer surface of said conical member and the inner surface of the cavity in said housing, and axial bearing means; and automatic means responsive to a variation in clearance in said radial bearing means for automatically varying the pressure of the fluid supplied to said axial bearing means for maintaining the clearance of said radial bearing means substantially constant.

4. The apparatus of claim 3 further comprising manual adjustment means for the axial bearing means for establishing a predetermined clearance between said electromagnetic transducer and the magnetizable surface on said conical member when said conical member is stationary and no fluid is supplied to said axial bearing means.

References Cited in the file of this patent

UNITED STATES PATENTS 2,929,671 Taylor ---------------- Mar. 22, 1960